United States Patent
Lee et al.

(10) Patent No.: US 10,325,312 B2
(45) Date of Patent: Jun. 18, 2019

(54) CONNECTED DEVICE-TRIGGERED FAILURE ANALYSIS

(71) Applicant: The Toronto-Dominion Bank, Ontario (CA)

(72) Inventors: John Jong-Suk Lee, Ontario (CA); Paul Mon-Wah Chan, Ontario (CA); Jonathan K. Barnett, Ontario (CA); Roisin Lara Fritz, Ontario (CA); Michael Grouios, Ontario (CA); Joe Moghaizel, Ontario (CA)

(73) Assignee: The Toronto-Dominion Bank, Toronto (CA)

( * ) Notice: Subject to any disclaimer, the term of this patent is extended or adjusted under 35 U.S.C. 154(b) by 310 days.

(21) Appl. No.: 15/271,853

(22) Filed: Sep. 21, 2016

(65) Prior Publication Data

US 2017/0061351 A1 Mar. 2, 2017

Related U.S. Application Data

(63) Continuation of application No. 15/251,696, filed on Aug. 30, 2016.
(Continued)

(51) Int. Cl.
*G06Q 40/02* (2012.01)
*G06F 11/07* (2006.01)
(Continued)

(52) U.S. Cl.
CPC .......... *G06Q 40/02* (2013.01); *G06F 11/008* (2013.01); *G06F 11/0736* (2013.01);
(Continued)

(58) Field of Classification Search
None
See application file for complete search history.

(56) References Cited

U.S. PATENT DOCUMENTS 7,657,440 B2 2/2010 Kuwata et al.
8,406,096 B1 * 3/2013 Edling ................. G11B 15/689
360/69

(Continued)

FOREIGN PATENT DOCUMENTS

WO WO2014151121 9/2014

OTHER PUBLICATIONS

Wentzlaff, "Internet of Things: Retail Banking (Bank of Things)", Feb. 3, 2015, 7 pages. http://blog.onapproach.com/internet-of-things-retail-banking-bank-of-things.
(Continued)

*Primary Examiner* — Thomas L Mansfield
(74) *Attorney, Agent, or Firm* — Fish & Richardson P.C.

(57) ABSTRACT

The present disclosure involves systems and computer implemented methods for performing a failure analysis on a device monitored by at least one connected device, where in response to a determination of an impending failure, at least one corrective action is determined and suggested to the user of the monitored device. In one example, operations include monitoring operations of at least one monitored device using at least one connected device, determining a projected life span of the at least one monitored device based on the monitored operations, and, if the projected life span of the monitored device is less than a threshold amount, determining a corrective action to perform. A proposal can be generated for presentation based on the corrective action. The proposal may be based on the estimated cost of the determined corrective action and an analysis of an account.

28 Claims, 4 Drawing Sheets

Related U.S. Application Data

(60) Provisional application No. 62/212,457, filed on Aug. 31, 2015.

(51) Int. Cl.
*G06Q 10/06* (2012.01)
*G06Q 10/00* (2012.01)
*G06F 11/00* (2006.01)

(52) U.S. Cl.
CPC ...... *G06F 11/0748* (2013.01); *G06F 11/0793* (2013.01); *G06Q 10/06315* (2013.01); *G06Q 10/20* (2013.01); *G06Q 40/025* (2013.01); *Y02P 90/86* (2015.11)

(56) References Cited

U.S. PATENT DOCUMENTS

| | | | |
|---|---|---|---|
| 8,566,227 | B2 | 10/2013 | Carroll et al. |
| 9,134,675 | B2* | 9/2015 | Yang .................. G03G 15/556 |
| 9,696,056 | B1* | 7/2017 | Rosenberg ............. F24F 11/30 |
| 2001/0032109 | A1 | 10/2001 | Gonyea et al. |
| 2001/0049618 | A1 | 12/2001 | Patzel et al. |
| 2003/0055766 | A1 | 3/2003 | Blanchard et al. |
| 2004/0186927 | A1* | 9/2004 | Eryurek ................. G05B 15/02 710/12 |
| 2004/0215577 | A1* | 10/2004 | Mitsuda ............... G06Q 20/085 705/77 |
| 2005/0049930 | A1* | 3/2005 | Sampark Padilla ... G06Q 30/02 705/26.1 |
| 2009/0204458 | A1* | 8/2009 | Wiese .................... G06Q 10/06 717/101 |
| 2010/0153080 | A1* | 6/2010 | Khan ................. G05B 23/0283 703/7 |
| 2010/0312522 | A1* | 12/2010 | Laberge ............. G05B 23/0227 702/184 |
| 2011/0188068 | A1* | 8/2011 | Jones ................... G06Q 30/018 358/1.15 |
| 2011/0218703 | A1 | 9/2011 | Uchida |
| 2011/0307141 | A1 | 12/2011 | Westerlage et al. |
| 2014/0156032 | A1* | 6/2014 | Jenkins .................... G05B 9/02 700/78 |
| 2014/0244017 | A1 | 8/2014 | Freiwirth et al. |
| 2014/0244834 | A1 | 8/2014 | Guedalia et al. |
| 2015/0095478 | A1 | 4/2015 | Zuerner |
| 2015/0117174 | A1 | 4/2015 | Alber et al. |
| 2016/0364975 | A1* | 12/2016 | R .............................. G06N 5/04 |
| 2017/0024939 | A1* | 1/2017 | Wonderlich ........... B65G 43/02 |
| 2017/0209338 | A1* | 7/2017 | Potucek ............. A61H 33/005 |

OTHER PUBLICATIONS

Pye, "The Internet of Things connecting the unconnected," Engineering & Technology, Dec. 2014, 5 pages.

Kwan et al, "Wireless Sensors with Advanced Detection and Prognostic Capabilities for Corrosion Health Management," Advanced Materials Research, vol. 38, pp. 123-131.

\* cited by examiner

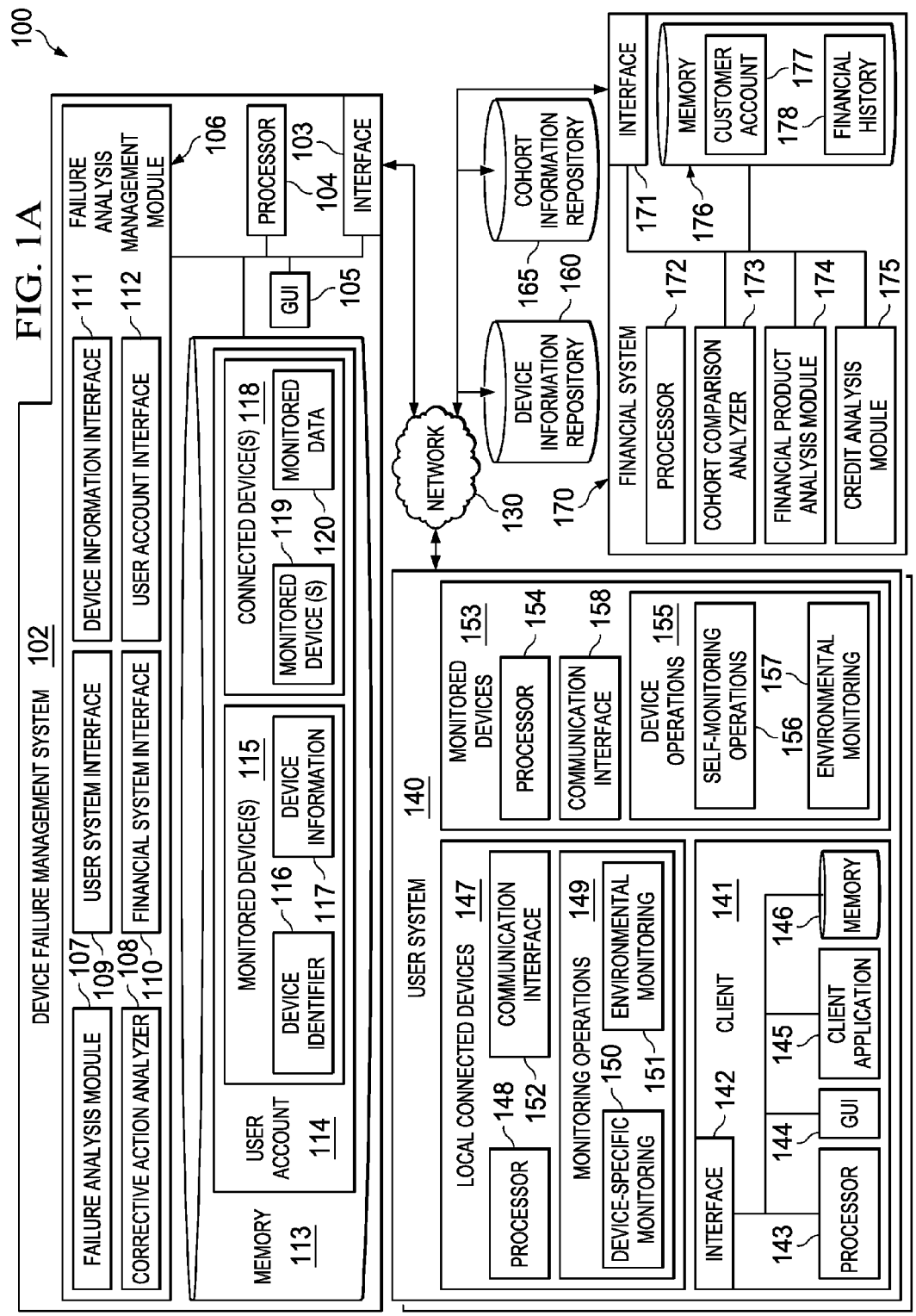

CONNECTED DEVICE-TRIGGERED FAILURE ANALYSIS

CROSS-REFERENCE TO RELATED APPLICATIONS

This application is a continuation of and claims the benefit of priority to U.S. patent application Ser. No. 15/251,696, filed on Aug. 30, 2016, which claims the benefit of priority to U.S. Provisional Application Ser. No. 62/212,457, filed on Aug. 31, 2015, the contents of which are hereby incorporated by reference.

TECHNICAL FIELD

The present disclosure relates to computer systems and computer-implemented methods for performing a failure analysis on one or more devices monitored by at least one connected device, where in response to a determination of an impending failure, at least one corrective action is determined, suggested to the user of the monitored device, and/or executed.

The network of connected devices can include a network of physical objects, or "things," embedded within electronics, software, sensors, and connectivity to enable and achieve greater value and service by exchanging data with the manufacturer, operator, and/or other connected devices or systems. Each device can be uniquely identifiable through its embedded computing system, and can interoperate through the existing Internet or local network infrastructure. In many cases, implementations of the network can provide services including machine-to-machine communications (M2M), such that information received from one machine can influence or modify the actions and activities of other machines.

SUMMARY

The present disclosure involves systems and computer implemented methods for performing a failure analysis on a device monitored by at least one connected device, where in response to a determination of an impending failure, at least one corrective action is determined and suggested to the user of the monitored device. In one example method, operations include monitoring operations of at least one monitored device using at least one connected device, the at least one monitored device associated with a user, determining a projected life span of the at least one monitored device based on the monitored operations, and, in response to determining that the projected life span of the at least one monitored device is less than a threshold amount, determining a corrective action to be performed. A proposal is then generated for presentation based on the determined corrective action.

In some instances, generating the proposal includes estimating a cost of the determined corrective action, analyzing an account, and creating the proposal to perform the determined corrective action based on a remaining life span of the at least one monitored device, the estimated cost of the determined corrective action, and the analysis of the account. In some instances, the account may be associated with the user of the monitored device.

In some instances, the at least one connected device is the monitored device, wherein the monitored device monitors its own operations. The monitoring operations of the at least one monitored device includes one or more of the following: monitoring a time of active operations performed by the at least one monitored device, monitoring a number of operations performed by the at least one monitored device, and monitoring at least one performance metric associated with the monitored operations of the at least one monitored device.

In some instances, determining the projected life span of the at least one monitored device includes performing a failure analysis of the at least one monitored device. The failure analysis of the at least one monitored device is based on, at least in part, at least one of the following: a usage amount of the at least one monitored device and a usage amount of the at least one monitored device as compared to usage metrics associated with a plurality of similar devices. Alternatively, the failure analysis of the at least one monitored device is based on, at least in part, a set of monitored performance metrics associated with the at least one monitored device. For example, the failure analysis of the at least one monitored device can be based on a comparison of the set of monitored performance metrics to a known set of performance metrics associated with a failure state. The known set of performance metrics associated with the failure state can be based on information collected from a plurality of similar devices. In other instances, the failure analysis of the at least one monitored device is based on a comparison of the set of monitored performance metrics to a set of expected performance metrics.

In some instances, the determined corrective action is based on at least one of the following: an analysis of the user's financial data, an analysis of the user's prior usage analytics of the at least one monitored device, an analysis of corrective actions taken by at least one other user associated with similar devices, information provided by a vendor of the at least one monitored device, an analysis of environmental data associated with the location of the at least one monitored device, and a determination as to an issue associated with the at least one monitored device. In some instances, the determined correction action includes an action and a delay of implementing the action. The delay of implementing the action is based on a projected remaining life span of the at least one monitored device, a current financial situation associated with the user, and pricing trends associated with a replacement device. The determined corrective action may be one of repairing or replacing the at least one monitored device.

In some instances, analyzing the account includes analyzing at least one of a financial or transactional account associated with the user. Analyzing the at least one of the financial or transactional account associated with the user can include determining whether funds are sufficient to cover a predicted cost of the determined corrective action are available in accounts associated with the user. Further, in response to determining that funds sufficient to cover the predicted cost of the determined corrective action are not available in accounts associated with the user, the method may include performing an automated credit worthiness determination based on a credit history of the user. The proposal may be generated in response to the credit worthiness determination determining that the user is worthy of credit, where the proposal comprises an offer of at least one loan product to pay for the predicted costs associated with the determined corrective action. The at least one loan product can includes a pre-approval for a repair or replacement of the at least one monitored device, and can also include an offer for a home equity line of credit, an unsecured line of credit, a personal loan, debt consolidation, a microfinance transaction, a person-to-person lending offer, and a crowdfunding loan offer. In one instance, in response to determining that funds sufficient to cover the estimated cost of the determined corrective action are not available in accounts associated with the user, the proposal may be a proposal to increase savings to pay for the estimated costs associated with the determined corrective action.

Similar or analogous computer-readable mediums storing non-transitory computer-readable instructions executable by a computer and configured to perform similar operations to the method may be used. Additionally, systems comprising at least one memory and at least one processor interoperably coupled with the at least one memory configured to perform the operations may be implemented.

In one example system, the system may comprise a memory and at least one hardware processor interoperably coupled with the memory, where the processor is configured to perform operations. The operations can include monitoring operations of at least one monitored device using at least one connected device, the at least one monitored device associated with a user and determining a projected life span of the at least one monitored device based on the monitored operations. In response to determining that the projected life span of the at least one monitored device is less than a threshold amount, a corrective action to be performed is determined and a proposal is generated for presentation via a graphical interface based on the determined corrective action. Generating the offer proposal includes generating estimating a cost of the determined corrective action and analyzing an account. The proposal associated with the determined corrective action is created based on the projected life span of the at least one monitored device, the estimated cost of the determined corrective action, and the analysis of the account. In some instances, the account may be associated with the user of the monitored device.

In some instances, the at least one connected device is the monitored device, wherein the monitored device monitors its own operations. In some instances, monitoring operations of the at least one monitored device can include one or more of monitoring a time of active operations performed by the at least one monitored device, monitoring a number of operations performed by the at least one monitored device, or monitoring at least one performance metric associated with the monitored operations of the at least one monitored device.

In some instances, determining the projected life span of the at least one monitored device includes performing a failure analysis of the at least one monitored device. The failure analysis of the at least one monitored device may be based on at least one of a usage amount of the at least one monitored device or a usage amount of the at least one monitored device as compared to usage metrics associated with a plurality of similar devices. Alternatively or additionally, the failure analysis can be based on, at least in part, a set of monitored performance metrics associated with the at least one monitored device, wherein the failure analysis of the at least one monitored device is based on at least one of a comparison of the set of monitored performance metrics to a known set of performance metrics associated with a failure state or on information collected from a plurality of similar devices. The failure analysis of the at least one monitored device may also be based on a comparison of the set of monitored performance metrics to a set of expected performance metrics.

In some instances, the determined corrective action is based on at least one of the following: an analysis of the user's financial data, an analysis of the user's prior usage analytics of the at least one monitored device, an analysis of corrective actions taken by at least one other user associated with similar devices, information provided by a vendor of the at least one monitored device, an analysis of environmental data associated with the location of the at least one monitored device, or a determination as to an issue associated with the at least one monitored device.

In some instances, the determined correction action can include an action and a delay of implementing the action, wherein the delay of implementing the action is based on a projected remaining life span of the at least one monitored device, a current financial situation associated with the user, and/or pricing trends associated with a replacement device. In some instances, the determined corrective action can be one of repairing or replacing the at least one monitored device.

In some instances, analyzing the account associated with the user includes analyzing at least one of a financial or transactional account associated with the user, which can include determining whether funds are sufficient to cover the estimated cost of the determined corrective action are available in accounts associated with the user. In some instances, the hardware processor may be further configured to perform an automated credit worthiness determination based on a credit history of the user in response to determining that funds sufficient to cover the estimated cost of the determined corrective action are not available in accounts associated with the user. In those instances, the proposal can be generated in response to the credit worthiness determination determining that the user is worthy of credit, wherein the proposal includes an offer of at least one loan product to pay for the estimated costs associated with the determined corrective action. In some instances, the at least one loan product can include a pre-approval for a repair or replacement of the at least one monitored device, wherein the at least one loan product includes at least one of an offer for a home equity line of credit, an unsecured line of credit, a personal loan, debt consolidation, a microfinance transaction, a person-to-person lending offer, and a crowdfunding loan offer. In some instances, in response to determining that funds sufficient to cover the estimated cost of the determined corrective action are not available in accounts associated with the user, the proposal can include a proposal to increase savings to pay for the estimated costs associated with the determined corrective action.

In some instances, the generated offer can be presented to the user via the user interface. In some instances, the device determines a corrective action and performs the immediate action if it is determined that the costs associated with the immediate action may reduce the future costs associated with the device over waiting for the user to provide their feedback on the proposed action. The hardware processor may determine that the immediate shut down of the device may prevent a irreparable damage increasing the costs associated if the immediate action is not taken.

While generally described as computer-implemented software embodied on non-tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 1A and 1B are block diagrams illustrating an example system for performing a failure analysis on one or more devices monitored by at least one connected device, where in response to a determination of an impending failure, at least one corrective action is determined and suggested to the user of the monitored device.

DETAILED DESCRIPTION

Figure 1B:
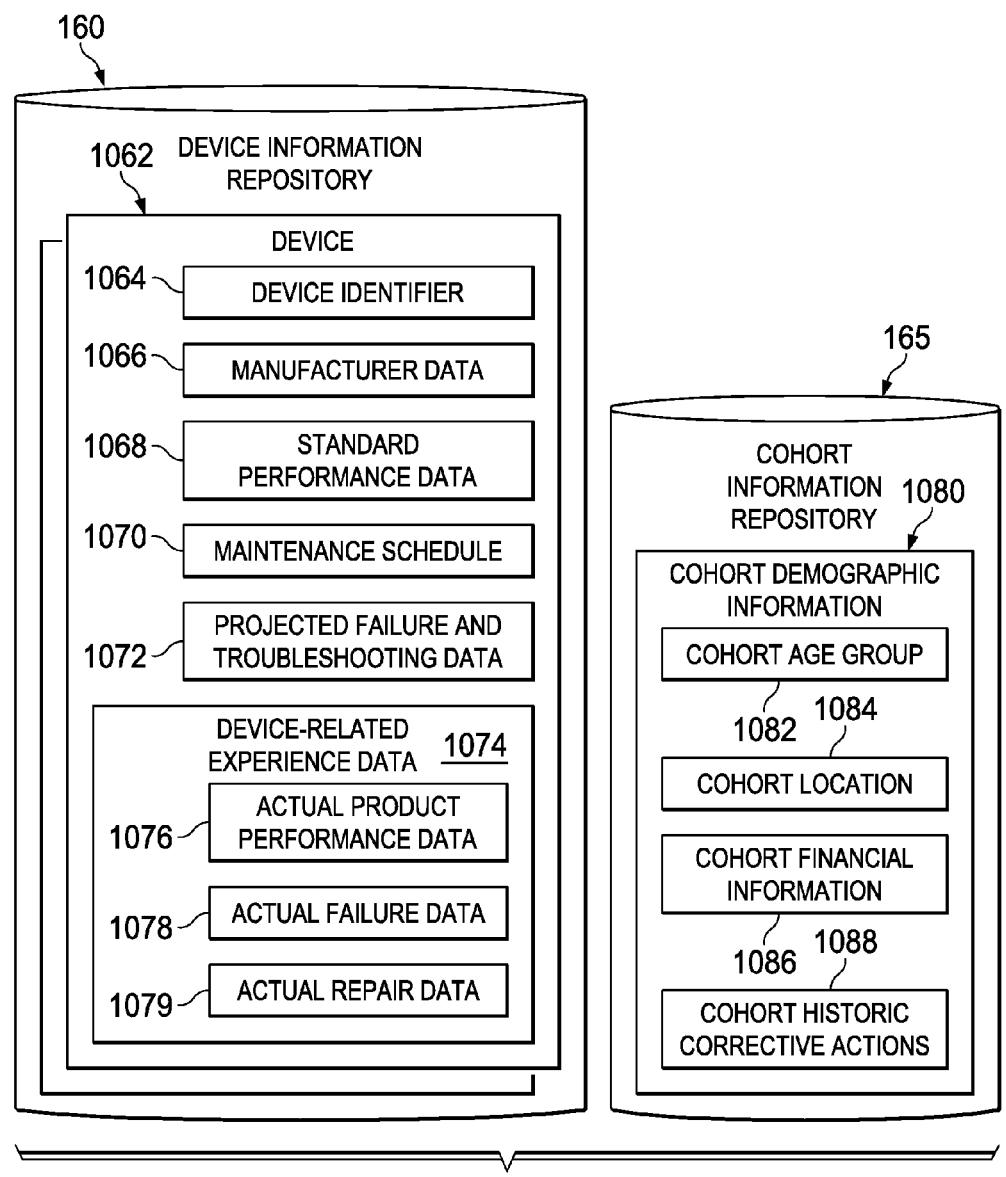

The present disclosure describes systems and methods for performing a failure analysis on one or more devices monitored by at least one connected device, where in response to a determination of an impending failure, at least one corrective action is determined and suggested to the user of the monitored device. Using connected devices capable of relaying sensor data back to a centralized or hub location, information related to the operations of one or more monitored devices can be captured and analyzed. The analysis of that information can be used to determine a progression of a life cycle of the monitored device such that events and signs indicating an upcoming failure or end-of-life event can be used to initiate a determination of one or more corrective actions to be taken. For example, based on data from connected devices, a determination that a particular device (e.g., a water heater) is near its end-of-life may be made.

For example, in a water heater example, one or more connected devices, including the water heater itself, may determine that the water temperature of the water heater is inaccurate or slow to reach the appropriate level on a reoccurring basis. Based on this information, as well as on known information about the specific model of the water heater, an end-of-life projection can be made. Using that projection, corrective action may include repairing or restoring the water heater or replacing the water heater. The particular corrective action to be suggested to the user may be based on a combination of (1) user data and history, (2) relative costs associated with repairing or replacing the device, and (3) actions taken by one or more cohorts of the user when facing a similar situation. Based on this set of information, the tools described herein can determine a best or suggested corrective action for the user. In response to the suggested corrective action, the tools can further initiate an analysis to determine the projected cost of such corrective action and whether the user has the funds and/or the financial ability to perform the corrective action. Should the user not have immediate funds and/or the financial ability to perform the corrective action, the tools herein can automatically determine the user's creditworthiness for one or more proposed financial offers to assist in paying for the projected cost. One or more offers may be generated, including pre-approvals, for various financial programs to assist in payment of the suggested corrective action. Once generated, those offers may be presented to the user, along with a notice that the monitored device is likely nearing its end-of-life. In some instances, the proposed offer may be associated with a savings or insurance-related product or change as opposed or in addition to offers for financial loans or lending-related events.

Restated, the tools and systems described herein provide on-going monitoring of one or more devices with an expected end-of-life date and/or usage amount (i.e., after X uses, failure is likely), and can be used or associated with any number of potential devices, including household appliances, vehicles, electronics, and other suitable devices. The system can provide the user with a warning message once the monitored device nears its expected end-of-life, when the device is monitored as being associated with an end-of-life or failure-related event, or when monitored performance of the device nears a failure threshold. The tools and systems can then determine whether the user is more likely to repair the existing device or purchase a replacement device. This determination can be based on the particular issue, defect, or malfunction of the device itself (e.g., based on the severity of the issue and/or the cost of repair), based on the present user's past behavior in repairing or replacing similar and/or other devices, based on the behavior of cohorts of the user (i.e., persons, households, and groups similar to those of the user), and/or the user's pre-defined financial and life goals. Once the corrective action (e.g., repair, replace, etc.) is determined, the system calculates the user's financial ability to perform the action and determines whether a suitable loan or other financial product should be offered to assist.

The benefits of the described system are many. For users or customers of a financial institution, notification that a device is reaching its end-of-life or a potential failure can be beneficial to avoid the inconvenience and cost of an unexpected failure. For example, issues with an HVAC in late spring can be identified so that the user is able to repair or replace the system before summer arrives. Further, the offers of financial programs to assist the user in covering the cost of the suggested corrective action can be made without any user request for said offers. The offers presented can be made at the time of the end-of-life/failure notification based on the monitored and analyzed performance of the device. In some instances, the offers may be actionable such that the user can immediately accept the offer and move forward with the repair or replacement without needing to secure further financing.

On the other side, the financial institution associated with the offer can increase customer loyalty and increase the reach and penetration of its lending portfolio by identifying potential opportunities without requiring users to request information on the loans before the offers are generated and sent to potential customers.

In the described solution, a centralized network hub may be used to manage the monitoring and analysis of the devices. For example, users can register their devices to be monitored and managed using the described system, where the centralized hub can collect performance and device information related to the registered monitored devices and perform the failure and end-of-life analyses. In various implementations, performance information associated with the monitored devices can be obtained differently. In some instances, the monitored device may share its own performance information with the centralized network hub as one source of information on the monitored device. In those instances, the monitored device may be a connected device, where connected devices are able to monitor the specific performance of particular devices (including themselves) as well as other environmental factors that may relate to the performance of particular devices. In a second implementation, one or more connected, or "smart," devices may monitor a non-connected, or "dumb," device and return information about the performance of the dumb device to the centralized hub. Algorithms may be known and used to apply information received from one or more monitoring devices regarding the monitored devices to assist in the end-of-life or failure analysis. Where information is obtained from connected devices other than the monitored device, users may in some instances need to register those monitoring connected devices with the centralized network hub to ensure that data from the monitoring devices is collected and applied from those devices. In some instances, the link between the monitoring devices and the monitored devices can be defined, where only information relevant to the monitored devices need to be shared with the network hub.

The tools and systems described in the present disclosure use financing offers as the primary offer or notification in relation to the results of end-of-life and failure analyses. However, alternatives to financing-specific offers may include one or both of savings and/or insurance offers or recommendations. For example, instead of preparing an offer to assist in financing the corrective action, the present solution can present the user with a recommendation to begin, continue, or increase their savings for the specific recommended corrective action to be suggested based on the device analysis. In some instances, the system may immediately and/or automatically implement an additional savings plan to cover the likely upcoming end-of-life and/or failure of the identified device(s). In others, the offer may be to begin savings for a particular corrective action, including a specified replacement device and/or an estimated cost of repairing the identified device.

Further, in an insurance-based offer or recommendation, insurance incentives may be provided to users to perform the recommended corrective action. For example, insurance premiums and/or deductibles may be tied to the account of the user. Where a potential failure or nearing end-of-life is identified, the system may increase the corresponding premium or deductible associated with the device. For example, if a hot water heater is identified as reaching a failure state, the system may notify the user that the premiums or deductible associated with water damage have been increased. In connection with the increase, the proposed correction may be provided, along with an indication that the raised premiums or deductible will be reversed and/or reduced to a new, lower level upon performing the corrective action (e.g., a repair or replacement). In some instances, the reduced premiums and/or deductibles can be offered without initially raising them in response to the failure or end-of-life determination. In another insurance-related example, an automatic claim process may be triggered and/or payouts based on device failures covered under an existing policy. In some instances, the potential failure and/or end-of-life determination can be used to avoid paying larger insurance claims by addressing the issue and determining a corrective action before a larger issue or issue-related complications occur.

Turning to the illustrated embodiment, FIG. 1A is a block diagram illustrating an example system 100 for performing a failure analysis on one or more devices monitored by at least one connected device, where in response to a determination of an impending failure, at least one corrective action is determined and suggested to the user of the monitored device. As illustrated in FIG. 1A, system 100 is a client-server and device-client system capable of sharing device performance information from a user system 140 (and its connected devices 147 and monitored devices 153) to a device failure management system 102. The device failure management system 102 can interact with various data sources (i.e., a device information repository 160 and cohort information repository 165) and a financial system 170, where information retrieved from those systems can be used to determine one or more potential corrective actions as well as potential offers for financial products based on those determined corrective actions. Information about the performance of particular monitored devices 153 can be shared with the device information repository 160, and the actions taken by the user can be shared with the cohort information repository 165, thereby providing feedback to modify future decisions for cohorts of the user to update device-related information. System 100 includes or is communicably coupled with the user system 140, the device failure management system 102, the financial system 170, the device information repository 160, the cohort information repository 165, and network 130. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, client 141 of the user system 140, the device failure management system 102, and financial system 170 may be any computer or processing device such as, for example, a blade server, general-purpose personal computer (PC), Mac®, workstation, UNIX-based workstation, or any other suitable device. Moreover, although FIG. 1A illustrates a single device failure management system 102, device failure management system 102 can be implemented using two or more systems, as well as computers other than servers, including a server pool. Further, while the financial system 170 is illustrated as separate from the device failure management system 102, in some instances the device failure management system 102 may be a part, integrated with, or otherwise associated with the financial system 170, and vice versa. The present disclosure contemplates computers other than general purpose computers, as well as computers without conventional operating systems. Similarly, the local connected devices 147 and the monitored devices 153 illustrated within the user system 140 may be their own computing devices and can receive instructions and/or content from the client 141, the user system 140, or any of the other components while being considered their own computer. Client 141 may be any suitable type of device including a smartphone, tablet, laptop computer, or any other suitable device. The local connected devices 147 and the monitored devices 153 may be directly associated with, embedded within, and/or integral to the client 141, or they may be separate therefrom. In general, these illustrated components may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the device failure management system 102 is used to receive, manage, analyze, and interact with information associated with one or more monitored devices 153, connected devices 147, financial system 170, and the device and cohort repositories 160, 165, in order to identify particular monitored devices 153 near their end-of-life state and/or failure point, and to subsequently identify and propose one or more corrective actions. The device failure management system 102 can connect to these systems to obtain information about a user, his registered devices (both monitored and for monitoring), financial information related to the corrective action, and information about the devices themselves and cohorts of the user. In some instances, the device failure management system 102 may be associated with and/or integral to the financial system 170, while in others, the device failure management system 102 is separate therefrom. Similarly, one or both of the device and cohort information repositories 160, 165 may be internal to the device failure management system 102 in some instances.

As illustrated, the device failure management system 102 includes an interface 103, a processor 104, a graphical user interface (GUI) 105, a failure analysis management module 106, and memory 113. The device failure management system 102 may connect directly or indirectly to one or more user systems 140 via a wireless or wired technology (e.g., via network 130, Bluetooth, Near-Field Communications (NFC), etc.), or the device failure management system 102 may contact or interact with one or more application programming interfaces (APIs) associated with one or more of the components within user systems 140, the financial system 170, and the repositories 160, 165. Where the device failure management system 102 is associated with two or more user systems 140, the device failure management system 102 can maintain separate profiles for each associated user account 114.

The interface 103 is used by the device failure management system 102 for communicating with other systems in a distributed environment—including within the environment 100—connected to the network 130, e.g., user systems 140, particular connected devices 147, monitored devices 153, clients 141, financial system 170, the repositories 160, 165, as well as other systems communicably coupled to the network 130. Generally, the interface 103 comprises logic encoded in software and/or hardware in a suitable combination and operable to communicate with the network 130. More specifically, the interface 103 may comprise software supporting one or more communication protocols associated with communications such that the network 130 or interface's hardware is operable to communicate physical signals within and outside of the illustrated environment 100. Still further, the interface 103 may allow the device failure management system 102 to create ad hoc or dedicated connections to one or more of the clients 141, local connected devices 147, or monitored devices 153, among others.

Network 130 facilitates wireless or wireline communications between the components of the environment 100 (e.g., between the clients 141 and the device failure management system 102, as well as between the device failure management system 102 or client 141 and the repositories 160, 165), as well as with any other local or remote computer, such as additional clients, servers, or other devices communicably coupled to network 130, including those not illustrated in FIG. 1A. In the illustrated environment, the network 130 is depicted as a single network, but may be comprised of more than one network without departing from the scope of this disclosure, so long as at least a portion of the network 130 may facilitate communications between senders and recipients. In some instances, one or more of the illustrated components (e.g., the device failure management system 102 itself) may be included within network 130 as one or more cloud-based services or operations. The network 130 may be all or a portion of an enterprise or secured network, while in another instance, at least a portion of the network 130 may represent a connection to the Internet. In some instances, a portion of the network 130 may be a virtual private network (VPN). Further, all or a portion of the network 130 can comprise either a wireline or wireless link. Example wireless links may include 802.11a/b/g/n/ac, 802.20, WiMax, LTE, and/or any other appropriate wireless link. In other words, the network 130 encompasses any internal or external network, networks, sub-network, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1A, the device failure management system 102 includes a processor 104. Although illustrated as a single processor 104 in FIG. 1A, two or more processors may be used according to particular needs, desires, or particular implementations of the environment 100. Each processor 104 may be a central processing unit (CPU), an application specific integrated circuit (ASIC), a field-programmable gate array (FPGA), or another suitable component. Generally, the processor 104 executes instructions and manipulates data to perform the operations of the device failure management system 102. Specifically, the processor 104 executes the algorithms and operations described in the illustrated figures, including the operations performing the functionality associated with the device failure management system 102 generally, as well as the various software modules (e.g., the failure analysis management module 106 and its failure analysis module 107, corrective action analyzer 108, and various interfaces 109, 110, 111, and 112), including the functionality for sending communications to and receiving transmissions from the various systems involved in the failure analysis and end-of-life calculations, as well as the generation of financial offers to perform the proposed corrective actions.

GUI 105 of the device failure management system 102 interfaces with at least a portion of the environment 100 for any suitable purpose, including generating a visual representation of a Web browser and/or the failure analysis management module 106. In particular, the GUI 105 may be used to view and navigate various Web pages located both internally and externally to environment 100, as well as to view and navigate through information accessed by the failure analysis management module 106, such as information stored at or associated with a particular user system 140 and its components, financial system 170, or one of the repositories 160, 165, among others. Generally, the GUI 105 provides the oversight user with an efficient and user-friendly presentation of data provided by or communicated within the system. The GUI 105 may comprise a plurality of customizable frames or views having interactive fields, pull-down lists, and buttons operated by the user. For example, the GUI 105 may provide interactive elements that allow a user to view or interact with information related to the operations of the process associated with the oversight process. The GUI 105, for example, may be where the user of the device failure management system 102 is able to provide feedback (e.g., confirmations of registrations of particular monitored devices 153) or otherwise interact with actions taken and requests made by the client-side user. The GUI 105 may present information associated with the client application 145, the monitored devices 153, or the connected devices 147 for viewing and interaction at the device failure management system 102. In general, the GUI 105 is often configurable, supports a combination of tables and graphs (bar, line, pie, status dials, etc.), and is able to build real-time portals and presentations, where tabs are delineated by key characteristics (e.g., site or micro-site). Therefore, the GUI 105 contemplates any suitable graphical user interface, such as a combination of a generic web browser, intelligent engine, and command line interface (CLI) that processes information in the platform and efficiently presents the results to the user visually.

The illustrated device failure management system 102 also includes memory 113, or multiple memories 113. The memory 113 may include any memory or database module and may take the form of volatile or non-volatile memory including, without limitation, magnetic media, optical media, random access memory (RAM), read-only memory (ROM), removable media, or any other suitable local or remote memory component. The memory 113 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the device failure management system 102. Additionally, the memory 113 may store any other appropriate data, such as VPN applications, firmware logs and policies, firewall policies, a security or access log, print or other reporting files, as well as others. For example, memory 113 can store user account information 114.

The user account information 114 can include user and user system-related information for one or a plurality of users. In the illustrated example, the user account information 114 includes data defining one or more monitored devices 115 and connected devices 118 (i.e., those perform the monitoring of devices 115) associated with a particular user. The data associated with each of the monitored devices 115 may be based on a registration performed by the user with the device failure management system 102 via client 141 (e.g., via client application 145), a connected device 147 (e.g., based on registration settings defined on the device 147), a monitored device 153 (e.g., based on registration settings defined on the monitored device 153 or on a controller or device capable of controlling the monitored device 153), or by any other suitable method, including through a device manufacturer website, financial institution website, or another method. By registering the devices with a particular user account 114, the device failure management system 102 can access user-related information from various locations as needed, such as the financial system 170. By registering the particular devices associated with the user system 140 of a particular user, the device failure management system 102 can access device-specific information from the device information repository 160 as well as experiential information on the particular device from the cohort information repository 165.

As illustrated, each monitored device 115 may be associated with any suitable information, including but not limited to a device identifier 116 (e.g., a serial number, model number, and other device-specific information) and device information 117 which may store operational information related to the corresponding monitored device 153. This information 117 may include the actual operational parameters, current or prior settings, time of use or operation, and other information associated with the particular monitored device 153 as received from the monitored device 153 itself or as provided by the user at or after registration. Any other suitable device-specific information may be included in device information 117, including information related to the user and or the location in which the monitored device 153 is installed or located. Further, the device information 117 may include information on a percentage or threshold where a corrective action may need to be taken, such as a percentage of remaining useful life or an estimated time remaining to perform the corrective action.

The connected device information 118 may be associated with one or more local connected devices 147 at the user system 140, where the local connected devices 147 specifically monitor one or more monitored devices 153 in the user system 140 and/or a set of general environmental characteristics associated with the environment or location of the user system 140. The connected devices 147 may be registered specifically with the device failure management system 102 by the user associated with the user system 140. In some instances, particular local connected devices 147 may be specifically associated with and monitoring a particular one or more monitored devices 153. In other instances, particular local connected devices 147 may be generally associated with the location of the user system 140 and can monitor environmental parameters associated with the user system 140. Depending on the type of monitored device 153, the environmental information may be used to determine or evaluate the potential failure of and/or the end-of-life estimate of one or more monitored devices 115. One example may be a connected or smart thermostat evaluating the efficiency of a home HVAC system. While the smart thermostat—the local connected device 147 in the example—may be unable to directly determine the performance of the HVAC system, the environmental factors associated with the current actual temperature in a location and the desired or set temperature may be used to provide and/or derive additional information about the end-of-life or failure analysis of the monitored device 153. Returning to the connected device information 118 stored in memory 113, each connected device 147 corresponding to particular connected device information 118 may be registered to be associated with one or more monitored devices 119 at the corresponding user system 140. Further, relevant monitored data 120 may be stored in memory 113 for use in performing the failure and end-of-life analyses.

As noted, the device failure management system 102 includes the failure analysis management module 106, where, in the illustrated example, the failure analysis management module 106 collects and manages the information related to the failure analysis. As illustrated, the device failure management system 102 includes a failure analysis module 107, corrective analysis analyzer 108, and four interfaces: a user system interface 109, a financial system interface 110, a device information interface 111, and a user account interface 112.

In general, the failure analysis management module 106 represents an application, set of applications, software, software modules, or combination of software and hardware used to manage the failure analysis and corrective action analysis for the illustrated system. In the illustrated solution, as described above, the device failure management system 102 is shown as a single system with the failure analysis management module 106 executing the primary activities. In many implementations, the device failure analysis management system 102 and/or the failure analysis management module 106 may be a set of related, remote, or individual components used to perform the described functionality of the single system 102 and/or module 106.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The failure analysis module 107 reviews the collected information on the monitored devices 153, the monitored data collected from the connected devices 147, information on the device from the device information repository 160, and information about device performance and life span from the cohort information repository 165, and uses that information to determine a potential or likely life or expected failure of the monitored device 153. In some instances, the failure analysis module 107 may rely on some or all of the above data, as well other data sources, to perform the analysis. While some or all of the information may be available locally at memory 113, the failure analysis module 107 can use any of the suitable interfaces 109, 110, 111, and 112, as well as interface 103, to retrieve and/or obtain additional information. For example, the failure analysis module 107 may connect directly to one or more of the connected devices 147 or monitored devices 153 to obtain additional or updated information. Using the available information, the failure analysis module 107 can determine whether a corrective action analysis should be initiated. That determination may be based on a remaining estimated life or an expected failure or nearing failure of the monitored device 153. Once identified or predicted, the failure analysis module 107 can trigger or initiate the corrective action analyzer 108 to determine what actions, if any, are needed to remedy the possible failure and/or end-of-life of the monitored device 153.

The corrective action analyzer 108 operates to identify a particular corrective action in light of the identified or predicted end-of-life or potential failure of the monitored device 153. The corrective action analyzer 108 considers the symptoms of the predicted failure or end-of-life, including the monitored data 120 captured by the one or more connected devices 147 and is stored in connected device information 118. In some instances, the corrective action analyzer 108 reviews device-specific information from the device information repository 160, information on similar devices and actions taken by cohorts of the user in the cohort information repository 165, as well as financial information from the financial system 170 to determine a suggested corrective action. In one example, the suggested corrective actions may include either replacing or repairing the monitored device 153. The corrective action analyzer 108 may also consider one or more user-defined goals associated with the user account 114 or a financial institution customer account 177. Still further, the corrective action analyzer 108 may consider the financial status of the user based on information available at the financial system 170.

The device information repository 160 is illustrated in FIG. 1B. As noted, the device information repository 160 can store and maintain information related to a plurality of various devices. The information stored in the repository 160 can include any number of data points associated with a plurality of devices. Each device 1062 may have an entry where device-specific information is maintained, such as in a database or other structured format. Alternatively, each device's entry may include a plurality of links to device-specific information stored in any suitable location, including websites and/or commercial databases. Particular devices 1062 may be associated with their specific device identifiers 1064, where the device identifier 1064 may include a model number or other uniquely identifying set of information.

Information included in or associated with each device 1062 may include a set of manufacturer data 1066, standard performance data 1068, maintenance information and schedules 1070, projected failure and troubleshooting data 1072, and device-related experiential data 1074. The manufacturer data 1066 may include generic information about the particular device 1062 from the manufacturer. The standard performance data 1068 may include a projected performance and metric data associated with the device 1062, including information from which deviations therefrom can be calculated (e.g., by the failure analysis module 107). In some cases, an expected life span of the device 1062 may be included in the standard performance data 1068, where the expected life span is a theoretical expected life span based on a normal usage pattern. The maintenance schedule 1070 may include a listing of scheduled maintenance procedures recommended or required for the device 1062.

The projected failure and troubleshooting data 1072 may include information related to common fixes, corrections, and life span-sustaining operations that may be experienced during operation and usage of the device 1062. This data 1072 may be provided by the manufacturer in some cases, as well as a collected knowledge base provided by other users, technicians, repair workers, and other persons having experience and/or knowledge related to the device 1062. The failure analysis module 107 and similar components may access and interpret the troubleshooting information to determine how and if a particular issue can be corrected and/or fixed to allow for repairing of the device 1062 if similar issues are faced. Additionally, information about whether a particular issue is indicative of a projected failure or whether particular metrics are signs of an impending failure may be included in this data.

The device-related experience data 1074 can include information and additional data of experiences seen, observed, or monitored by one or more other users, including records and information associated with failures of other devices of the same type. In some instances, the information may be manually entered by the other users, the manufacturer, repair technicians, or other individuals. Alternatively, at least some of the information may be automatically entered based on detected issues or readings in smart systems, including one or more connected devices 147 and/or monitored devices 153 from other user systems 140. In some instances, the device-related experiential data 1074 may include a set of actual product performance data 1076, including information on the actual life span seen or obtained by others. The actual product performance data 1076 may differ from the standard performance data 1068, and may reflect, in some cases, a more accurate estimation of actual life spans to be expected. In some instances, the actual product performance data 1076 may include information on the operating environment of the particular devices 1062 for which the actual data was captured, where that information can be compared to the environment in the user system 140 to modify or update a failure analysis or end-of-life estimate. The device-related experiential data 1074 also include actual failure data 1078, which can provide information on various device failures experience by other users or entities. For example, if a particular error is constantly seen prior to a device failure, the actual failure data 1078 may include such information, where the failure analysis module 107 can determine if the monitored device 153 is experiencing similar issues during the monitoring periods at the user system 140. As illustrated, the device-related experiential data 1074 includes actual repair data 1079, where the results of prior attempted repairs may be maintained. This information can be weighed by the corrective action analyzer 108 to determine the likelihood of success in prior repair attempts. Further, cost information associated with repairs can be located or stored with the actual repair data 1079, again providing an additional data point in the corrective action analysis.

While the device information repository 160 is illustrated as separate from the other components, the repository 160 may be a part of or implemented within one of the other components or in another location as appropriate in alternative implementations. Further, a subset of the information in the illustrated repository 160 may be available in alternative implementations, as well as alternative and/or additional information or data.

Returning to FIG. 1A, the failure analysis module 107 and corrective action analyzer 108, as well as the failure analysis management module 106 itself, may use any of the user system interface 109, financial system interface 110, device information interface 111, or user account interface 112 to access and interact with information at any of the corresponding components or systems. In some instances, portions of the analysis performed by the components may be sent to or executed at one of the corresponding systems. For example, a financial analysis related to a particular corrective action may be performed at the financial system 170 with the results returned to the device failure analysis management system 102 and incorporated into the execution of the full analysis process.

The various interfaces may be specifically-designed portions of the interface 103, portions of the failure analysis management module 106 or its components, or a remotely executed portion of the corresponding components. Alternatively, the interfaces may be software executed to access web services or native applications capable of accessing data at the various sources and collecting that data at the device failure management system 102.

In general, the illustrated modules of the failure analysis management module 106 may be combined into a single application or module in some instances. As noted, some of the failure analysis management module 106 may be located or available at one or more remote systems, including a portion of the user system 140 or the financial system 170.

In some instances, the corrective analysis analyzer 108 may take additional input into consideration on the actions to be taken, including the user's purchase history and/or a market analysis related to pricing or sales/discounts for replacement purchases or repairs. Further, the failure analysis module 107 may determine a potential or likely failure window for monitored device 153. Based on this failure window, the corrective action analyzer 108 may determine a suggested corrective action as well as a time for the action to be taken. For example, if a determination is made that a failure for a monitored device 153 is likely in six (6) months, the information may be provided to the corrective action analyzer 108 for consideration. If the corrective action analyzer 108 identifies or determines that a significant end of season sale is occurring, or if a manufacturer introduces significant savings on a potential replacement device, the corrective analyzer 108 may determine that a move up or acceleration of the replacement or action date is suggested such that the savings can be realized. Similarly, if additional time is available prior to the failure and costs at the current time are higher than likely future market costs, the corrective analyzer 108 may suggest a delayed strategy to replacing the device.

The user system 140, as illustrated, represents any user-related ecosystem or environment where at least one monitored device 153 is monitored for a failure and/or end-of-life analysis. In particular, the user system 140 may be a location of a business or entity (e.g., a factory or office), as well as a location at which a local user can work, live, or interact, such as a home office, home generally, roaming office, or car, among others. For example, a user system 140 may designate or be associated with a single location or multiple locations, where the user system 140 is associated with at least one user. In some instances, the device failure management system 102 may be physically located at or near the user system 140, such as running on a client 141 or other system associated with the user. In other instances, the device failure management system 102 may be remotely located from the user system 140, including when the device failure management system 102 is implemented as a cloud-based system or provided by a third-party, including the financial system 170.

The user system 140 includes client 141 associated with the user, one or more monitored devices 153, and one or more local connected devices 147. The client 141 may be any computing device operable to connect to or communicate with the device failure management system 102, other clients 141, or other components via network 130, as well as the with the network 130 itself, using a wireline or wireless connection. Each client 141 may be or include a desktop computer, a mobile device, a tablet, a server, or any other suitable computer device. In general, client 141 comprises an electronic computer device operable to receive, transmit, process, and store any appropriate data associated with the environment 100 of FIGS. 1A and 1B. In particular, client 141 executes one or more client applications 145. In some instances, at least one of the client applications 145 may be used to correspond with the device failure management system 102, including to register one or more devices 147, 153 with the user account 114, and to receive information associated with a failure analysis performed, at least in part, by or at the device failure management system 102.

As illustrated, client 141 includes an interface 142, a processor 143, a graphical user interface (GUI) 144, a client application 145, and memory 146. The interface 142, processor 143, and GUI 144 may be similar to or different than the interface 103, processor 104, and GUI 105 described for the device failure management system 102. In general, processor 104 executes instructions and manipulates data to perform the operations of the client 141. Specifically, the processor 143 executes the algorithms and operations described in the illustrated figures and associated with the client 141, including the operations performing the functionality associated with the client application 145. Memory 146 may be similar to or different than memory 113. While illustrated generally, memory 146 may store or maintain information on either or both local connected devices 147 and monitored devices 153, for example, when local storage of data and information related to the components are used. In those instances, the client application 145 or another module or software can share this information with the device failure management system 102, where and when appropriate.

Client 141 executes client application 145 operable to perform any suitable functionality, including but not limited to managing one or more devices 147, 153 present at the user system 140. Client application 145 may be a web application, desktop application, portal page or portal-based application or process, a dedicated mobile application, or other software.

The illustrated client 141 is intended to encompass any computing device such as a desktop computer, laptop/notebook computer, mobile device, smartphone, personal data assistant (PDA), tablet computing device, one or more processors within these devices, or any other suitable processing device. For example, the client 141 may comprise a computer that includes an input device, such as a keypad, touch screen, or other device that can accept user information, and an output device that conveys information associated with the operation of the client application 145 or the client 141 itself, including digital data, visual information, or a GUI 144, as shown with respect to the client 141.

The plurality of monitored devices 153 may include many different device types, where each monitored device(s) 153 is capable of having a determined or projected failure and/or end-of-life analysis performed upon it. Some monitored devices 153 may be smart or network-connected devices, where the devices can communicate and share information with other connected systems, including the device failure management system 102. In those instances, the monitored devices 153 may be able to provide performance and operational information directly to the device failure management system 102. In other instances, the monitored devices 153 may be non-connected, or dumb devices. In those instances, separate connected devices 147 may monitor the operations of the monitored device(s) 153, providing information on the relative and absolute performance of the monitored device 153 to the device failure management system 102. The monitored device 153 illustrated in FIG. 1A is an example of one of any number of variations of monitored devices 153, and is meant to be an example device. Alternative, additional, or different components may be associated with and/or included within different implementations.

As illustrated, the monitored device 153 includes a processor 154, a set of device operations 155 to be performed by the monitored device 153, and a communications interface 158. The processor 154 may be similar to or different from processor 104 and 143 as described for the device failure management system 102 and client 141. In general, processor 154 executes instructions and manipulates data to perform the operations of the monitored device 153. As illustrated, each monitored device 153 may include a set of device operations 155 to be executed by the processor 154. These operations may be associated with the normal performance of the tasks and methods as performed by the device. For example, when the device 153 is an HVAC, the device operations 155 include heating and cooling a house or location. In addition to the general device operations 155, some of the monitored devices 153 may include one or more self-monitoring operations 156 and/or environmental monitoring operations 157. The self-monitoring operations 156 can allow the device 153 to provide the device failure management system 102 with information about the operations of the device 153 itself, including internal operation information, self-calculated performance metrics, and other relevant information. The environmental monitoring operations 157 can allow the device 153 to monitor one or more factors or parameters external to the device 153. For example, a monitored device 153 may be a thermostat. The internal information may include thermostat settings while the external information may be a resulting temperature detected by the device 153.

The monitored device 153 may include a communications interface 158, where the communications interface 158 allows the monitored device 153 to interact and/or communicate with the device failure management system 102, the client 141, and any other suitable component. In some instances, the monitored device 153 may be managed or controlled by an external component via the communication interface 158.

A particular monitored device 153 may be affected by changes, actions, or failures of other devices associated with the particular monitored device 153. For example, one or more "upstream" devices from the monitored device 153 may be the source of issues or anomalous readings or performance associated with the monitored device 153. In those instances, the system (e.g., the failure analysis module 107) may identify issues associated with the upstream device based on readings from or information derived by or about the monitored device 153. The failure or operations of one monitored device 153 may be indicative of a change or issue with another device associated with the monitored device 153. In some instances, the monitored device 153 may be a non-connected device, such as a "dumb" dishwasher without connected functionality. The dishwasher itself may be the monitored device 153, even in situations where specific performance associated with the dishwasher may be difficult to directly determine. The information about the dishwasher may be captured based on readings from one or more other devices within the user system 140, such as the efforts of a hot water heater, a smart electricity panel, or another appropriate monitored device 153 and/or connected device 147. Additional efforts (e.g., water heating higher than normal, higher or lower requests for water, energy usage correlated to the dishwasher, etc.) expended by those related devices may be correlated and identified as due to the dishwasher even though information about the dishwasher directly are unavailable. Similarly, one or more "downstream" devices may be monitored through use of a non-connected and/or connected device. In another dishwasher example, a connected dishwasher may be used to determine that a non-connected hot water heater is about to fail based on, for example, a length of time it takes for hot water to be provided or where the temperature of the water is insufficient or below/above an expected and correct temperature. Using similar procedures and knowledge of devices to be monitored, many if not all of "dumb" devices can be monitored devices 153 by combining available information from one or more connected devices 147.

The local connected devices 147 represent one or more devices in the user system 140 that are used to monitor the operations of at least one monitored device 153. In some instances, a particular connected devices 147 may itself be a monitored device 153, while in others, the connected devices 147 may be separate from the one or more monitored devices 153. In some instances, a connected device 147 may be both a monitored device 153 and a connected device 147, in that the connected device 147 may be monitored for potential failures and end-of-life calculations as well as monitor one or more other monitored devices 153. In particular, a connected device 147 may be able to provide smart-functionality to a particular "dumb" monitored device 153, or may provide additional "smart" functionality (e.g. one or more sensors and/or other data capturing abilities) to an existing smart monitored device 153. For example, additional environmental information and/or monitored device performance results may be captured externally by the connected device 147 than can be captured by the monitored device 153 alone. At least some of the additional information that can be captured by the connected device 147 can be provided to the failure analysis management module 106.

As illustrated, the connected device 147 includes a processor 148, a set of monitoring operations 149, and a communications interface 152. Processor 148 may be similar to processor 154, and may perform and execute the various operations of the particular connected device 147. Those operations may include the specific monitoring operations 149 performed by the connected device 147, as well as standard operating operations (not illustrated). For example, where the connected device 147 performs a non-monitoring function, the standard operating operations may be executed by the processor 148. Where monitoring functions are to be performed, the processor 148 can perform those operations 149. The monitoring operations 149 can include device-specific monitoring operations 150 as well as environmental monitoring 151. The device-specific monitoring operations 150 can be monitoring operations specifically associated with the operations of a monitored device 153. For example, an amount of electricity used by the device 153 may be monitored, as well as run time, current settings, or other suitable parameters. In contrast, the environmental monitoring operations 151 may include monitored environmental factors that may relate, either directly or indirectly, to the monitored device 153. For example, if the monitored device 153 is an HVAC system, the environmental factors associated with the HVAC system may be a temperature or humidity in the associated location. The failure analysis management module 106, knowing the connected devices 147 and the monitored devices 153 present in a particular user system 140, can use the device-specific monitoring data and the environmental monitoring data and apply that data to assist in the failure analysis process. As illustrated, the connected devices 147 may use a communication interface 152 (similar to or different from the communications interface 158 of the monitored devices 153) to communicate with the device failure management system 102.

As illustrated, environment 100 includes the financial system 170. The illustrated financial system 170 represents a system where customer-specific financial information related to the failure analysis and corrective action determination can be obtained, and where financial products used to finance, if necessary, the corrective action are identified. In some instances, some or a portion of the device failure management system 102 may be located at or associated with the financial system 170. Additionally, some or all of the information from the device information repository 160 and cohort information repository 165 may be stored at, associated with, or otherwise related to the financial system 170. As illustrated in FIG. 1A, however, the financial system 170 can receive information from and share information with any, all, or a subset of the other illustrated components via network 130. In some instances, the financial system 170 may be associated with a particular financial institution, such as a bank, credit union, peer-to-peer lending or crowdfunding entity, or any other suitable lending-based institution or entity.

As illustrated, the financial system 170 includes interface 171, processor 172, cohort comparison analyzer 173, financial product analysis module 174, credit analysis module 175, and memory 176. Interface 171 and processor 172 may be similar to or different from interfaces 103, 142 and processors 104, 143, 148, 154. Processor 172 executes the various modules and corresponding instructions illustrated in the financial system 170. Interface 171 allows the financial system 170 to communicate with and retrieve information from or send information to some or all of the components communicably connected via network 130.

The cohort comparison analyzer 173 can be used, in part, to determine a potential corrective action based, in part, on cohorts of the user associated with the monitored device 153. In some instances, the cohort comparison analyzer 173 may be located outside of the financial system 170, including at the device failure management system 102, where it may be a portion of the corrective action analyzer 108. The corrective action analyzer 108 may initiate or remotely control the cohort comparison analyzer 173 in some instances. In general, the cohort comparison analyzer 173 can access information associated with the user (e.g., demographics such as income information, location, etc.) to determine, based on the particular monitored device 153, what similarly situated individuals or groups of individuals have done at the end of a particular device's life cycle or in response to a failure prediction. In some instances, the cohort comparison analyzer 173 can access information associated with the user account 114 at the device failure management system 102, at the financial system 170, or at any other available location, where the accessed information can determine the particular cohort group to be considered in the analysis. Once the group is determined, information related to the cohort group can be obtained from any suitable location describing or monitoring actions performed by the corresponding cohort. For example, the cohort information repository 165 may store information on various individuals' actions, decisions, and demographics, where those individuals can be grouped into particular cohorts to provide group-based information on similar actions when facing failure and/or end-of-life for a particular device 153.

As illustrated, the cohort information repository 165 is remote from any one particular component of environment 100, although in other illustrations and implementations, the cohort information repository 165 may be located within or a part of one or more of the components, including the financial system 170 or the device failure management system 102. Turning to FIG. 1B, a detailed view of an example cohort information repository 165 is available.

As illustrated, the cohort information repository 165 includes one or more sets of cohort demographic information 1080. In some instances, on-the-fly calculations of particular cohorts may be made instead of a pre-defined demographic analysis, where different attributes of particular users are more heavily weighted in determining a corresponding cohort to the current user. For example, for HVAC devices, the location of the cohort members, due to weather effects on the lifecycle of the HVAC system, may be more heavily weighted than a particular income or family size of those same members and the current user. Similar dynamic cohort groupings can be executed to provide the most relevant set of cohort data to the analysis.

As illustrated, the cohort demographic information 1080 can include information on the cohort's age group 1082, location 1084, financial information 1086, and the historical corrective actions 1088 performed by the cohort members. Additional and/or alternative information may be available in the cohort demographic information 1080. In some instances, the information may be listed in a table, database, or similar data structure without specific organization, or without a required or pre-generated set of cohorts. When a request is received related to the current user, an analysis can be performed by the cohort comparison analyzer 173 to generate an appropriate cohort, where the information associated with that appropriate cohort is then used to determine and weigh the actions taken by those cohort members in light of the situation faced by the current user. The cohort set may be limited to persons or entities who owned the exact same device as the current user, while in other instances, the cohort set may include persons or entities who have similar, but not identical, devices. The historic corrective actions 108B of the cohort may be used to determine what actions were taken previously, as well as the costs of those actions. In some instances, information regarding why a particular action was taken may also be included. The financial information 108G of the cohort members can be analyzed to determine whether the financial situation of a particular cohort member or group of cohort members factored into or helped determine the action taken. This information can be used by the cohort comparison analyzer 173 to provide input to the corrective action analyzer 108, where appropriate.

The financial system 170 also includes the financial product analysis module 174 and the credit analysis module 175. The financial product analysis module 174 can assist in performing a determination of one or more financial products to be offered to the user once a particular corrective action is determined, or alternatively, to determine if the user would qualify for a particular corrective action. If the user cannot qualify for the action, then an alternative corrective action may be proposed. The financial product analysis module 174 may be integrated into the financial institution's loan offerings, and may also factor in the availability of funds of the current user to pay for at least a part of the corrective action in cash, already available credit, or similar means. The financial products available and that may be offered may include a home equity line of credit (HELOC), a home equity loan, an unsecured line of credit, a credit card offer, debt consolidation, micro-financing, P2P lending, or crowdfunding, among others. The credit analysis module 175 may determine the creditworthiness of the user and therefore determine the types of financial products available, as well as the associated terms. The credit analysis module 175 can access, when granted permission to do so, customer accounts 177 and financial history 178, including credit reports related to the user. Using the determined creditworthiness of the user, particular loan programs can be detected and offered to pay for and/or finance the corrective action as determined by the corrective action analyzer.

In some instances, the financial system 170 may identify one or more third-party financial products that may be offered to the user after the creditworthiness determination and costs of the corrective action are determined. In some instances, those third-party financial products may be associated with sponsored offers for financing and/or products, allowing the financial institution of the financial system 170 to identify multiple solutions for their customers.

In addition to the standard customer information 177 and financial history information 178, the financial system 170 may store information identifying or describing one or more customer life and/or financial goals. The goals may include becoming debt-free, purchasing a home, or other suitable life/financial goals that may be stored in the system. This information may be incorporated into both the cohort comparison analysis, the determination of particular financial products to be offered, and the corrective action to be suggested. By working in line with the goals of the customer, the financial system 170 can enhance the banking/ financial and personal goals of the user in an effort to increase the bond and understanding between the customer and the financial institution.

While portions of the software elements illustrated in FIGS. 1A and 1B are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
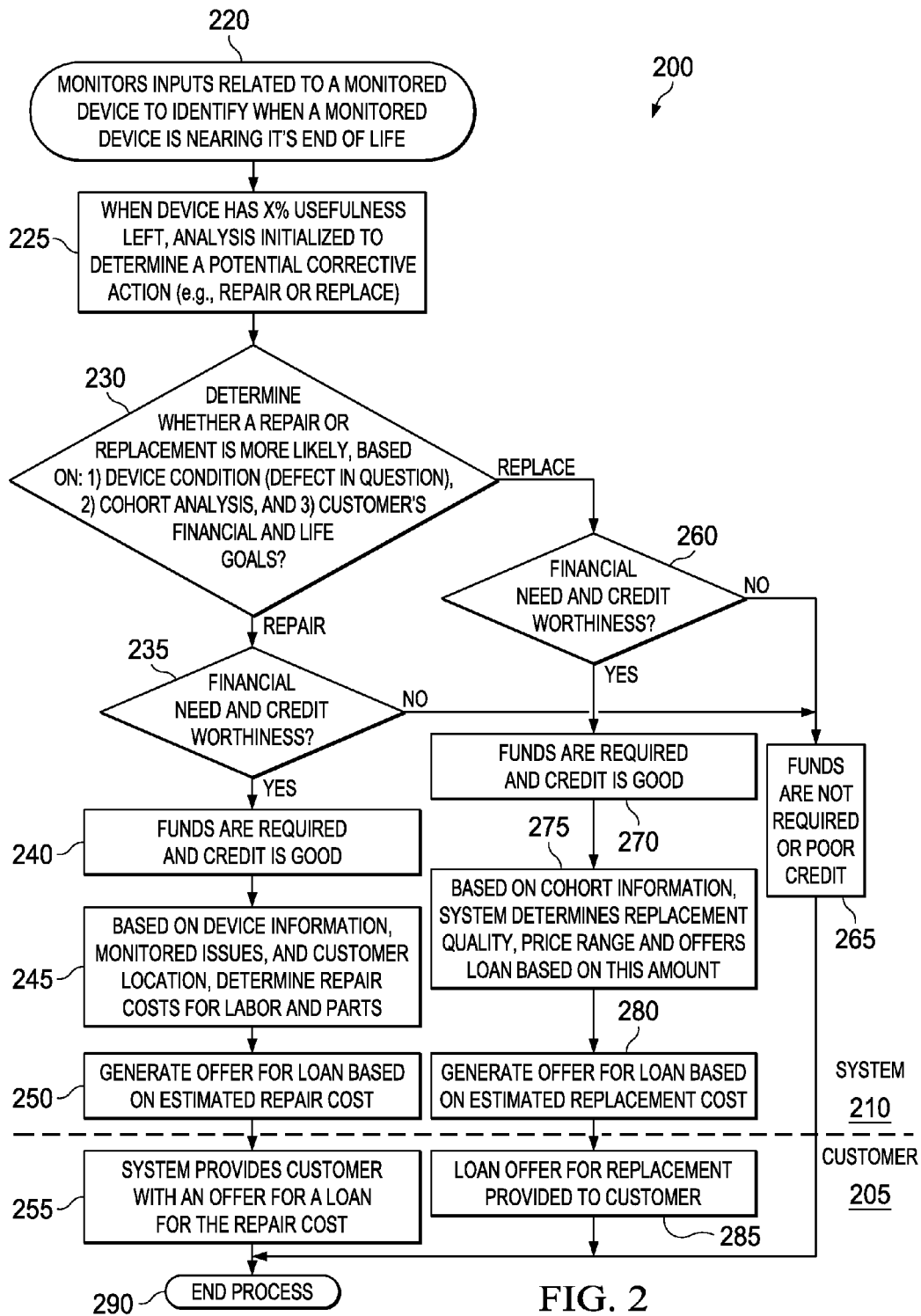
FIG. 2 is a swim lane diagram of example operations for performing a failure analysis and subsequent corrective action recommendations and offers.

FIG. 2 is a swim lane diagram of an example process 200 for a performing a failure analysis, identifying at least one corrective action recommendation, and generating an offer for financial lending to execute to the recommended corrective action. For clarity of presentation, the description that follows generally describes process 200 in the context of the system 100 illustrated in FIGS. 1A and 1B. However, it will be understood that process 200 may be performed, for example, by any other suitable system, environment, software, and hardware, or a combination of systems, environments, software, and hardware as appropriate. Further, this illustration is meant to be a simple example of potential implementations of the described tools, and is not meant to be limiting to persons of ordinary skill in the art.

In process 200, a customer (or user) 205 and system 210 are illustrated. The customer 205 may be associated with one or more monitored devices (e.g., monitored devices 153 of FIG. 1A) and at least one connected device (e.g., connected device 147 of FIG. 1A) monitoring the operations of the one or more monitored devices. In some instances, one or more monitored devices may themselves be connected devices that perform the monitoring of themselves and/or other monitored devices. The illustrated flow includes various portions of the illustrated environment of FIGS. 1A and 1B as within the system 210 portion of the swim lane diagram. For example, the device failure management system 102 and the financial system 170 are considered within the system 210 lane.

At 220, inputs related to a monitored device are monitored by the system 210 (e.g., at the device failure management system 102 of FIG. 1A) to identify when a monitored device is nearing its end-of-life, or alternatively, is nearing a potential failure. The inputs for this determination may include performance information and metrics received directly from the monitored device, device-specific monitoring information from a monitoring device (e.g., a connected device 147 of FIG. 1A), environmental inputs from one or more monitoring devices near or local to the monitored device, and device-specific information associated with similar devices used by others in other implementations.

At 225, when a device's likely life span goes below a certain threshold percentage (e.g., X %) of its remaining usefulness, or when the likely remaining time of continued usage at a certain level reaches a certain remaining threshold time (e.g., 6 months), the system 210 can initialize an analysis to determine a potential corrective action to take in light of impending end-of-life or failure of the monitored device. In the illustrated example, for simplicity's sake, the two corrective actions are considered to be repairing or replacing the device. In other implementations, additional corrective actions may be available or proposed. In some instances, the corrective action may be to continue with the device until failure occurs.

At 230, a determination is made as to whether a repair or replacement is to be suggested. The determination can be made based on a combination of several factors, including those described in FIGS. 1A and 1B. In the illustrated example of process 200, the determination is based on 1) the device and the device's condition or reason for its end-of-life or projected failure, 2) an analysis of a cohort set similarly situated to the customer 205, and 3) a set of the customer's financial and life goals. Additional criteria and parameters may be included in the determination in alternative implementations, as well as a subset of these.

Where the system 210 determines that the suggested corrective action is to repair the device, process 200 continues to 235. At 235, a determination is made as to whether the customer 205 has a financial need for assistance in performing the repairs and, if so, whether the customer 205 is creditworthy to receive and be approved for one or more financial offers. A financial need for assistance may be present if the customer does not have enough funds in cash or available credit to cover the costs of the repair. In some instances, the creditworthiness analysis may be performed only after the financial need is established, although in some instances, the analyses can be performed concurrently or simultaneously. If either of the analyses is a no, process 200 continues to 265, where funds are either not required or the customer is not creditworthy. In those cases, method 200 continues to 290 where the process ends. If, however, both the funds are required and credit is good, method 200 continues through 240 and moves to 245.

At 245, based on the device information, monitored issue, and customer location, as well as any other suitable factors, a repair cost for labor and parts of the repair is determined. The determined costs may be based on the costs experienced by one or more of the cohorts determined relative to the customer 205, or the costs may be estimated based on known part prices and local labor fees. In some instances, the creator or administrator of the system 210 may contract or receive pre-authorized prices associated with particular repairs. In some instances, the costs may be an estimate used to prepare the offer for a loan and to ensure that the costs needed will be covered. At 250, the offer for a loan product is generated based on the estimated repair cost. As noted, the type of loan product may differ based on the customer 205, the customer's credit and financial need, the type of device being repaired, and other customer-specific and financial institution-specific parameters. At 255, the customer 205 is presented with the offer for the loan product to cover at least a part of the repair cost. As illustrated, process 200 continues to 290 where the process ends. While not illustrated, the customer 205 may be able to accept the pre-approved loan after receiving the offer. In some instances, the offer may include one or more referrals for the repair work, including sponsored offers for repair technicians or parts needed to perform the repair. In some instances, accepting the loan may initiate a request for the repair to a licensed technician or repair person.

Returning to 230, if the determination is made that the corrective action is to replace the device, process 200 continues to 260. At 260, a determination (similar to that of 235) is made as to whether the customer 205 has a financial need for assistance in replacing the device and, if so, whether the customer 205 is creditworthy to receive and be approved for one or more financial offers. If the customer 205 either does not have a financial need or is not creditworthy, process 200 continues to 265. If, however, a need is identified for funds and the customer 205 is creditworthy, process 200 continues through 270 and, at 275, a determination is made based on cohort information, customer information, and device information, a replacement quality and price range upon which the replacement action is to be based. For example, a determination may be performed to determine if a replacement of the same type and/or quality is to be performed. Additionally, a determination as to whether the same model as is being replaced is to be used, or whether a newer model should be used. This determination may be based on whether the device being replaced is obsolete, out of production, or has one or more safety recalls associated with it, among others. Additionally, the type of replacement may be based on information about one or both of the customer 205 (e.g., approved funding, prior purchasing decisions, comparison between available options, etc.) or the cohort group (e.g., purchases for cohort members similarly situated as the customer 205, reported experiences with different products including varying quality and price levels of replacements, etc.).

Based on the determined replacement device, an offer for a loan based on the estimated replacement cost can be generated at 280. Similar to 250, the offer for a loan product is generated based on the estimated replacement cost, and the type of loan product may differ based on the customer 205, the customer's credit and financial need, the type of replacement device, and other customer-specific and financial institution-specific parameters. At 285, the customer 205 is presented with the offer for the loan product to cover at least a part of the replacement cost. As illustrated, process 200 continues to 290 where the process ends. If interested, the customer 205 may be able to accept the offered loan at this time. In some instances, accepting the loan may automatically trigger or initiate a purchase process for the replacement device.

Figure 3:
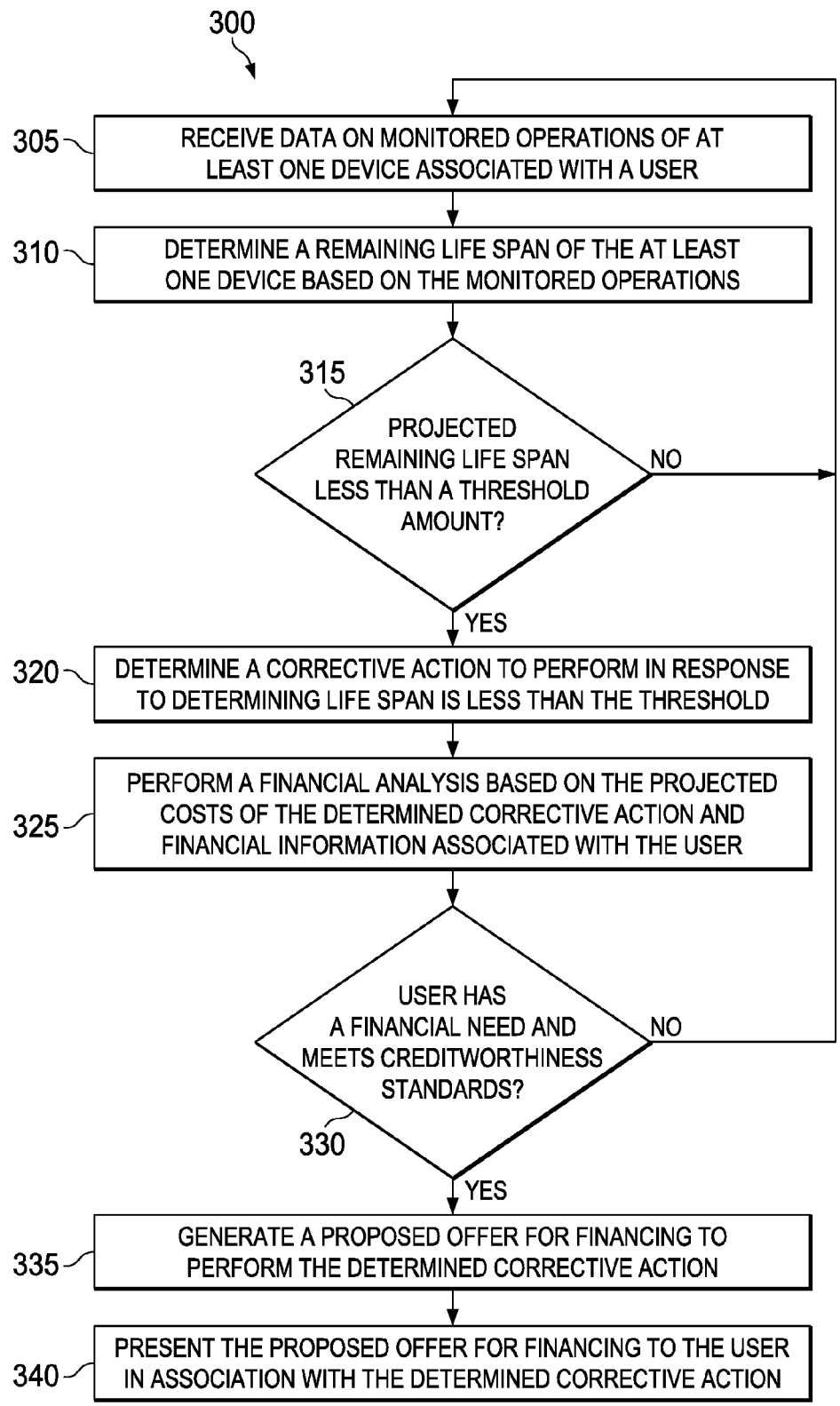
FIG. 3 is a flowchart of example operations for performing a failure analysis and subsequent corrective action recommendations and offers from the perspective of a failure analysis system.

FIG. 3 is a flowchart of example operations for a method 300 performing a failure analysis and subsequent corrective action recommendations from the perspective of a failure analysis system. For clarity of presentation, the description that follows generally describes method 300 in the context of the system 100 illustrated in FIG. 1A. However, it will be understood that method 300 may be performed, for example, by any other suitable system, environment, software, and hardware, or a combination of systems, environments, software, and hardware as appropriate.

At 305, data on monitored operations of at least one device are received. The monitored operations can be associated with a particular user. As described above, the monitored operations may be received from one or more devices, including the monitored device itself, one or more nearby connected devices capable of device-specific monitoring and/or environmental monitoring. Both the monitored device(s) and the connected device(s) may be registered with a centralized or remote failure analysis system. This failure analysis system can receive the monitored data. The monitored data can be interpreted, for example, in light of data related to the specific device (e.g., manufacturer information and other device-specific information) and information related to other users having prior experience with similar or identical devices. Based on that interpretation, a remaining life span or projected failure analysis of the at least one monitored device can be determined at 310 based on the monitored operations and related information.

At 315, method 300 determines whether a projected remaining life span of the device as calculated is less than a threshold life span amount. The threshold amount may be a percentage of the device's overall life span (e.g., X % of remaining life), an absolute amount of time remaining (e.g., a number of months), or another suitable threshold amount. In some instances, the threshold amount may vary based on one or more external factors, including whether the monitored device has been recalled, whether potential replacement devices are on sale, clearance, or other reduced price, whether an analysis of a cohort group indicates that earlier replacements are preferred or commonly made, as well as others. Further, life or financial events associated with the user may modify the threshold amount. For example, end of year bonuses may increase available funds for the user, and may mean that an earlier replacement is possible. If a user loses their job, the threshold amount may decrease so that the corrective action is taken or suggested much closer to the end-of-life or failure event of the monitored device. If a user has made several recent large purchases, the threshold amount may be lowered to delay the corrective action suggestion, while if the user has managed a personalized budget well or unexpected funds arrived such that extra funds are available, the threshold may be increased to cause the corrective action to be suggested earlier. Various suitable events can affect the threshold amount needed to trigger the next actions. Alternatively, the threshold event may be triggered, and corrective actions may be determined, where, based on the current user status and information related to the corrective action, device, or cohorts, the determined corrective action may be suggested as an immediate implementation or as a future implementation. If the life span is not less than the threshold amount, method 300 returns to 305. If it is, method 300 continues at 320.

At 320, a corrective action to be performed is determined in response to the determination that the life span is less than the threshold amount. As described above, the corrective action may include one or more suitable actions to anticipate the potential end-of-life or potential failure of the device. In some instances, the two options may be to repair the device or to replace the device. In alternative implementations, additional options for corrective actions may be available. The corrective action decision may be based on multiple factors, including the reasons for the end-of-life or failure determination (e.g., a particular issue or monitored reading associated with the device), the relative costs between repairing (e.g., labor and parts) and full replacement, information on improved energy efficiency and long-term savings of replacement versus repairing, user financial status, life status and goals, and related information, and information on the corrective actions taken by one or more users in a cohort group may have performed.

At 325, a financial analysis is performed based on the projected costs of the determined corrective action and financial information associated with the user. The financial analysis can include (1) a determination of whether the user is in financial need of assistance in performing the corrective action and, if financial need is determined, (2) whether the user meets creditworthiness standards for one or more potential financial products. Initially, the determination of whether the user is in financial need of assistance may be based on one or more of the user's financial accounts, including a determination of whether funds are available to cover the projected costs of the corrective action. The determination may also be based on preset or known user financial goals, including indications that the user would like to avoid and/or build new credit. These decisions and user settings can assist in shaping the determination as to whether the financial need exists. If the need exists, then a credit and/or credit score analysis of the user may be performed to determine whether the user qualifies for some or all of the available financial products used to pay or assist in paying for the corrective action. Various credit requirements may be associated with different financial products such that some users may qualify for all, a portion of, or none of the available financial products. In some instances, the financial analysis may cause a revision to the determined corrective action, such as when a user may not be able to afford an initial proposed action and instead may be better served to afford an alternative proposed corrective action. In some instances, the operations at 320 may include a full or abbreviated financial analysis in an attempt to avoid later revisions to the corrective action. As determined at 330, if the user either does not have a financial need or is not creditworthy for any particular loan offerings, method 300 returns to 305. If, however, a financial need exists and the user is determined to meet the creditworthiness standards associated with at least one financial offering as determined at 330, method 300 continues at 335.

At 335, a proposed offer for financing to perform and pay for the determined corrective action is generated. Multiple loan types and parameters may be available from a financial institution to offer. The particular loan offerings may be based on the user's financial history, amount of need, current financial status, available loan programs and products, and current incentives or promotions, among others. Different loan offerings may include, but are not limited to, a credit card offer, a revolving credit line, a home equity loan or line of credit, an unsecured line of the credit, debt consolidation, micro-financing, P2P lending, or crowdfunding, among others. In some instances, the offer may cover an entire cost of the corrective action, while in others, the offer may cover only a portion of the cost of the corrective action. In some instances, only a notification of a particular corrective action recommended may be provided, such that the user is notified of the need. In others, a potential loan or financing offering may be provided, even where there is no need for financing based on the user's financial situation and/or financial goals.

At 340, the proposed offer for financing is presented to the user in association with the determined corrective action. The user may then be able to immediately, or after a period of time, accept the proposed offer. In some instances, the offers may be associated with a link or offer to purchase the replacement device or repair services, such as through sponsored or collaborative links or business relationships with the service or goods providers. In this manner, the user may be guaranteed a better or best offer along with the loan offer.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In one alternative implementation, the threshold values associated with a failure or end-of-life analysis may be associated with multiple actions. For example, in the illustrated example of FIG. 2, at 225 the potential corrective action determination is initiated when a device's likely life span goes below a certain threshold percentage (e.g., X %) of its remaining usefulness, or when the likely remaining time of continued usage at a certain level reaches a certain remaining threshold time. In an alternative implementation, different thresholds may be set (e.g., for some or all devices, for some or all users) such that different proposals related to a determined corrective action may be suggested or taken. For example, when a device is determined to have only 25% of its life remaining, the financial offer may not be for a loan as illustrated in FIG. 2, but rather for a savings plan to be implemented by the user. When the device is determined to have only 10% of its life remaining, then the offer for a loan or lending product to perform the corrective action may be generated, where the offer generated may be based, in part, on a determination of need that reflects the savings previously initiated at the prior threshold. When the device is determined to have less than 1% of its life remaining, the "offer" generated may be insurance-related, such as an increase to insurance-related costs (e.g., higher premiums and/or deductible until the corrective action is taken) or an offer to reduce insurance-related costs if the corrective action is taken (e.g., a decrease in premium or deductible). By providing different thresholds of offers associated with the corrective actions, the customer can avoid being surprised with replacement costs, and can plan for such costs, well in advance of the likely failure or end-of-life date.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   a memory;
   at least one hardware processor interoperably coupled with the memory and configured to:
     monitor operations of at least one monitored device using at least one connected device, the at least one monitored device associated with a user, the at least one connected device separate and different from the at least one monitored device, the at least one connected device having a sensor for monitoring operations associated with the at least one monitored device;
     determine a projected life span of the at least one monitored device based on the monitored operations;
     in response to determining that the projected life span of the at least one monitored device is less than a threshold amount, determine a corrective action to be performed; and
     generate a proposal to be presented, via an interface, based on the determined corrective action, wherein generating the proposal includes:
       creating the proposal based on the projected life span of the at least one monitored device;
       estimating a cost of the determined corrective action; and
       analyzing at least one of a financial or transactional account associated with the user, wherein analyzing the at least one of the financial or transactional account associated with the user includes:
         determining whether funds are sufficient to cover the estimated cost of the determined corrective action are available in accounts associated with the user; and
         in response to determining that funds sufficient to cover the estimated cost of the determined corrective action are not available in accounts associated with the user, perform an automated credit worthiness determination based on a credit history of the user, wherein the proposal is generated in response to the credit worthiness determination determining that the user is worthy of credit, and wherein the proposal comprises an offer of at least one loan product to pay for the estimated costs associated with the determined corrective action,
     wherein creating the proposal associated with the determined corrective action is based on the projected life span of the at least one monitored device, the estimated cost of the determined corrective action, and the analysis of the account associated with the user.

2. The system of claim 1, wherein the at least one monitored device comprises a non-connected device, the at least one monitored device not comprising an ability to monitor its own operations.

3. The system of claim 1, wherein the at least one monitored device monitors at least some of its own operations, wherein the operations monitored by the at least one monitored device are included with the operations monitored by the at least one connected device for determining the projected life span of the at least one monitored device.

4. The system of claim 1, wherein monitoring operations of the at least one monitored device by the at least one connected device includes the at least one connected device monitoring at least one of the following:
   a time of active operations performed by the at least one monitored device;
   a number of operations performed by the at least one monitored device; and
   at least one performance metric associated with the monitored operations of the at least one monitored device.

5. The system of claim 1, wherein monitoring operations of the at least one monitored device by the at least one connected device comprises monitoring at least one environmental parameter associated with the at least one monitored device.

6. The system of claim 5, wherein the at least one environmental parameter associated with the at least one device comprises at least one environment parameter occurring external to the at least one monitored device, wherein the at least one environmental parameter is affected by operation of the at least one monitored device.

7. The system of claim 6, wherein the at least one environmental parameter is monitored by the at least one connected device in a location affected by the operation of the at least one monitored device.

8. The system of claim 6, wherein determining the projected life span of the at least one monitored device based on the monitored operations comprises comparing metrics associated with the at least one monitored environmental parameter to at least one expected metric associated with the environment parameter.

9. The system of claim 8, wherein the at least one expected environmental parameter is based on at least one environmental parameter observed in association with one or more devices similar to the at least one monitored device.

10. The system of claim 1, wherein determining the projected life span of the at least one monitored device includes performing a failure analysis of the at least one monitored device.

11. The system of claim 10, wherein the failure analysis of the at least one monitored device is based on, at least in part, at least one of the following:
    a usage amount of the at least one monitored device; and a usage amount of the at least one monitored device as compared to usage metrics associated with a plurality of similar devices.

12. The system of claim 10, wherein the failure analysis of the at least one monitored device is based on, at least in part, a set of monitored performance metrics associated with the at least one monitored device, wherein the failure analysis of the at least one monitored device is based on at least one of a comparison of the set of monitored performance metrics to a known set of performance metrics associated with a failure state or on information collected from a plurality of similar devices, and wherein the failure analysis of the at least one monitored device is based on a comparison of the set of monitored performance metrics to a set of expected performance metrics.

13. The system of claim 1, wherein the determined corrective action is based on at least one of the following:
an analysis of the user's financial data;
an analysis of the user's prior usage analytics of the at least one monitored device;
an analysis of corrective actions taken by at least one other user associated with similar devices;
information provided by a vendor of the at least one monitored device;
an analysis of environmental data associated with the location of the at least one monitored device; and
a determination as to an issue associated with the at least one monitored device.

14. The system of claim 1, wherein the determined correction action includes an action and a delay of implementing the action, wherein the delay of implementing the action is based on a projected remaining life span of the at least one monitored device, a current financial situation associated with the user, and pricing trends associated with a replacement device.

15. The system of claim 1, wherein the determined corrective action is one of repairing or replacing the at least one monitored device.

16. A non-transitory, computer-readable medium storing computer-readable instructions executable by a computer and configured to:
monitor operations of at least one monitored device using at least one connected device, the at least one monitored device associated with a user, the at least one connected device separate and different from the at least one monitored device, the at least one connected device having a sensor for monitoring operations associated with the at least one monitored device;
determine a projected life span of the at least one monitored device based on the monitored operations;
in response to determining that the projected life span of the at least one monitored device is less than a threshold amount, determine a corrective action to be performed; and
generate a proposal to be presented, via an interface, based on the determined corrective action, wherein generating the proposal includes:
creating the proposal based on the projected life span of the at least one monitored device;
estimating a cost of the determined corrective action; and
analyzing at least one of a financial or transactional account associated with the user, wherein analyzing the at least one of the financial or transactional account associated with the user includes:
determining whether funds are sufficient to cover the estimated cost of the determined corrective action are available in accounts associated with the user; and
in response to determining that funds sufficient to cover the estimated cost of the determined corrective action are not available in accounts associated with the user, perform an automated credit worthiness determination based on a credit history of the user, wherein the proposal is generated in response to the credit worthiness determination determining that the user is worthy of credit, and wherein the proposal comprises an offer of at least one loan product to pay for the estimated costs associated with the determined corrective action,
wherein creating the proposal associated with the determined corrective action is based on the projected life span of the at least one monitored device, the estimated cost of the determined corrective action, and the analysis of the account associated with the user.

17. The medium of claim 16, wherein the at least one monitored device comprises a non-connected device, the at least one monitored device not comprising an ability to monitor its own operations.

18. The medium of claim 16, wherein the at least one monitored device monitors at least some of its own operations, wherein the operations monitored by the at least one monitored device are included with the operations monitored by the at least one connected device for determining the projected life span of the at least one monitored device.

19. The medium of claim 16, wherein monitoring operations of the at least one monitored device by the at least one connected device includes the at least one connected device monitoring at least one of the following:
a time of active operations performed by the at least one monitored device;
a number of operations performed by the at least one monitored device; and
at least one performance metric associated with the monitored operations of the at least one monitored device.

20. The medium of claim 16, wherein monitoring operations of the at least one monitored device by the at least one connected device comprises monitoring at least one environmental parameter associated with the at least one monitored device, wherein the at least one environmental parameter associated with the at least one device comprises at least one environment parameter occurring external to the at least one monitored device, wherein the at least one environmental parameter is affected by operation of the at least one monitored device.

21. The medium of claim 20, wherein determining the projected life span of the at least one monitored device based on the monitored operations comprises comparing metrics associated with the at least one monitored environmental parameter to at least one expected metric associated with the environment parameter.

22. The medium of claim 16, wherein determining the projected life span of the at least one monitored device includes performing a failure analysis of the at least one monitored device, wherein the failure analysis of the at least one monitored device is based on, at least in part, a set of monitored performance metrics associated with the at least one monitored device, wherein the failure analysis of the at least one monitored device is based on at least one of a comparison of the set of monitored performance metrics to a known set of performance metrics associated with a failure state or on information collected from a plurality of similar devices, and wherein the failure analysis of the at least one monitored device is based on a comparison of the set of monitored performance metrics to a set of expected performance metrics.

23. A computerized method performed by one or more processors, the method comprising:
monitoring operations of at least one monitored device using at least one connected device, the at least one monitored device associated with a user, the at least one connected device separate and different from the at least one monitored device, the at least one connected device having a sensor for monitoring operations associated with the at least one monitored device;
determining a projected life span of the at least one monitored device based on the monitored operations;
in response to determining that the projected life span of the at least one monitored device is less than a threshold amount, determining a corrective action to be performed, wherein the determined corrective action is one of repairing or replacing the at least one monitored device; and
generating a proposal to be presented, via an interface, based on the determined corrective action, wherein generating the proposal includes:
estimating a cost of the determined corrective action;
analyzing at least one of a financial or transactional account associated with the user, wherein analyzing the at least one of the financial or transactional account associated with the user includes:
determining whether funds are sufficient to cover the estimated cost of the determined corrective action are available in accounts associated with the user; and
in response to determining that funds sufficient to cover the estimated cost of the determined corrective action are not available in accounts associated with the user, perform an automated credit worthiness determination based on a credit history of the user, wherein the proposal is generated in response to the credit worthiness determination determining that the user is worthy of credit, and wherein the proposal comprises an offer of at least one loan product to pay for the estimated costs associated with the determined corrective action; and
creating the proposal associated with the determined corrective action based on the projected life span of the at least one monitored device, the estimated cost of the determined corrective action, and the analysis of the account associated with the user.

24. The method of claim 23, wherein the at least one monitored device comprises a non-connected device, the at least one monitored device not comprising an ability to monitor its own operations.

25. The method of claim 23, wherein the at least one monitored device monitors at least some of its own operations, wherein the operations monitored by the at least one monitored device are included with the operations monitored by the at least one connected device for determining the projected life span of the at least one monitored device.

26. The method of claim 23, wherein monitoring operations of the at least one monitored device by the at least one connected device includes the at least one connected device monitoring at least one of the following:
a time of active operations performed by the at least one monitored device;
a number of operations performed by the at least one monitored device; and
at least one performance metric associated with the monitored operations of the at least one monitored device.

27. The method of claim 23, wherein monitoring operations of the at least one monitored device by the at least one connected device comprises monitoring at least one environmental parameter associated with the at least one monitored device, wherein the at least one environmental parameter associated with the at least one device comprises at least one environment parameter occurring external to the at least one monitored device, wherein the at least one environmental parameter is affected by operation of the at least one monitored device, and wherein the at least one environmental parameter is monitored by the at least one connected device in a location affected by the operation of the at least one monitored device, and wherein determining the projected life span of the at least one monitored device based on the monitored operations comprises comparing metrics associated with the at least one monitored environmental parameter to at least one expected metric associated with the environment parameter.

28. The method of claim 23, wherein determining the projected life span of the at least one monitored device includes performing a failure analysis of the at least one monitored device, wherein the failure analysis of the at least one monitored device is based on, at least in part, a set of monitored performance metrics associated with the at least one monitored device, wherein the failure analysis of the at least one monitored device is based on at least one of a comparison of the set of monitored performance metrics to a known set of performance metrics associated with a failure state or on information collected from a plurality of similar devices, and wherein the failure analysis of the at least one monitored device is based on a comparison of the set of monitored performance metrics to a set of expected performance metrics.

* * * * *